United States Patent
Armstrong (10) Patent No.: US 10,927,925 B2
(45) Date of Patent: Feb. 23, 2021

(54) WELL TRACTOR DRIVE SECTION WITH PAIRS OF DRIVE ARM BEARINGS MUTUALLY OPPOSITELY DISPLACED FROM THE CENTRE LINE

(71) Applicant: C6 TECHNOLOGIES AS, Stavanger (NO)

(72) Inventor: Kenny Armstrong, Glasgow (GB)

(73) Assignee: C6 Technologies AS, Stavanger (NO)

( * ) Notice: Subject to any disclaimer, the term of this patent is extended or adjusted under 35 U.S.C. 154(b) by 266 days.

(21) Appl. No.: 16/076,581

(22) PCT Filed: Feb. 2, 2017

(86) PCT No.: PCT/NO2017/050030
§ 371 (c)(1),
(2) Date: Aug. 8, 2018

(87) PCT Pub. No.: WO2017/138817
PCT Pub. Date: Aug. 17, 2017

(65) Prior Publication Data
US 2019/0048976 A1 Feb. 14, 2019

(30) Foreign Application Priority Data
Feb. 9, 2016 (EP) .................................. 16154809

(51) Int. Cl.
*E21B 23/00* (2006.01)
*F16H 1/22* (2006.01)
(Continued)

(52) U.S. Cl.
CPC ............. *F16H 1/222* (2013.01); *E21B 23/00* (2013.01); *E21B 23/14* (2013.01); *F16H 1/006* (2013.01); *E21B 23/001* (2020.05)

(58) Field of Classification Search
CPC ................................ E21B 23/001; E21B 23/14
(Continued)

(56) References Cited

U.S. PATENT DOCUMENTS 3,789,511 A 2/1974 Groom et al.
4,302,881 A * 12/1981 Schwind ................. E21B 47/08
33/544.3
(Continued)

FOREIGN PATENT DOCUMENTS

WO 2008/111844 A1 9/2008
WO 2015/044346 A2 4/2015

OTHER PUBLICATIONS

International Search Report and Written Opinion for PCT Application No. PCT/NO2017/050030, dated Jul. 31, 2017, in 9 pages.
(Continued)

*Primary Examiner* — Taras P Bemko
(74) *Attorney, Agent, or Firm* — Procopio, Cory, Hargreaves & Savitch LLP (57) ABSTRACT

A well tractor drive section comprising—a drive section body (0) with main central axis (0x), with—first and second drive wheels (10A, 10B) on the outer ends of first and second wheel arms (12A, 12B); inner ends of said wheel arms (12A, 12B) arranged pivotally about first and second transverse axes (8Ax, 8Bx) in first and second transverse-axial wheel arm bearings (14A, 4B) for said wheel arms (12A, 12B) to rotate in a direction away from said main axis (0x) to engage said drive wheels (10A, 10B) with an inner wall of a well; —said first and second transverse-axes (8Ax, 8Bx) being mutually oppositely laterally displaced with a first separation (d1) from said main central axis (0x) in a common perpendicular plane (8P) relative to said main central axis (0x).

13 Claims, 5 Drawing Sheets

(51) Int. Cl.
*E21B 23/14* (2006.01)
*F16H 1/00* (2006.01)

(58) Field of Classification Search
USPC .................................................... 166/241.1
See application file for complete search history.

(56) References Cited

U.S. PATENT DOCUMENTS

| | | | |
|---|---|---|---|
| 9,890,602 B2* | 2/2018 | Guttormsen | E21B 23/00 |
| 2005/0145415 A1 | 7/2005 | Doering et al. | |
| 2010/0012315 A1* | 1/2010 | McInally | E21B 23/14 |
| | | | 166/241.5 |
| 2015/0167416 A1* | 6/2015 | Ludwig | E21B 23/14 |
| | | | 166/385 |
| 2019/0040698 A1* | 2/2019 | Fuglestad | E21B 23/14 |

OTHER PUBLICATIONS

European Search Report for EP Patent Application No. 16154809, completed on Jul. 18, 2016, in 2 pages.

* cited by examiner

Figure 3a
(orth. to Fig. 3b)

Figure 3b
(orth. to Fig. 3a)

WELL TRACTOR DRIVE SECTION WITH PAIRS OF DRIVE ARM BEARINGS MUTUALLY OPPOSITELY DISPLACED FROM THE CENTRE LINE

INTRODUCTION

The invention is a well tractor drive section wherein one of the features is that the wheel arm bearings are in mutually oppositely displaced positions with regard to the main axis. In an advantageous embodiment corresponding actuator rods or so-called push rods are also in mutually oppositely displaced positions, please see FIG. 1. Given an otherwise limited axial push force from an actuator, this feature of opposite separation of the bearing and the actuator rod for each arm provides an increased mechanical advantage of the arm, and thus an increased force of the drive wheels against the wall of the well.

PRIOR ART AND PROBLEMS RELATED THERETO

The applicant has a U.S. Pat. No. 326,593 filed 23 Jan. 2007; "Arrangement of wheel driven transport device for moving forward a tool in boreholes and pipelines" wherein single oppositely directed drive wheel arms are distributed along a drive section body of a downhole tool. The arms are actuated by pairs of cogged rods engaging with spur gear axles for each arm bearing. The arm bearings are centrally arranged in the drive section body, please see FIG. 4 (prior art) herein. The drive arm is actuated via a cogged wheel arranged axially at the pivot axis of the wheel and thus requires a high transverse axial length of the wheel arm. This reduces the available space for the cogged wheel and also the available space for displacing the actuator rods while still fitting into a cylindrical pressure housing. The separation between the actuator rods and thus the mechanical advantage of each drive arm is thus not high. The length of the tool contributes to the overall length of the tractor which thus limits the amount of tractor-borne tools to enter the well through the lock chamber.

Figure 5:
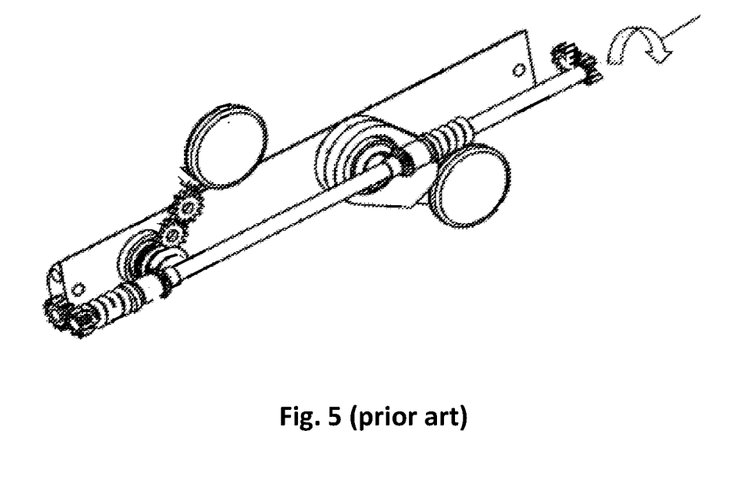
FIG. 5 is an illustration of a non-axial longitudinally extending long drive axle for two non-parallel drive wheel arms, one of them showing only the internal gear train from the input bevel gear to the drive wheel, the other with a complete drive wheel arm housing.

In the same patent, the wheel arms comprise a non-centric drive axle arranged parallel with but offset from the tool axis, please see FIG. 5 (prior art) herein. The prior art drive section requires a long, laterally shifted drive axle for transferring the input axle via the drive arms to the drive wheels. Access to the drive arms for assembly, repair or replacement requires removal of the drive axles and actuator rods. Transfer of the axially directed rotational moment occurs through separate sets of axial bevel gears on the drive axle and a transverse bevel gears for each arm.

Further, in the same patent, the wheel arms and wheels fold in into a series of slots, again requiring much length in the tool. Further, wheels exerting unparalleled forces against the borehole wall may result in the tool being out of centre in the bore in the well, particularly if one wheel passes over a restriction or widening of the bore such as in a slide valve or over a liner hanger. Further, single point forces may incur bending moments to the drive section and the tractor body.

US2005/0145415 Doering describes a wheel tractor section with a pair of idler wheels mounted on spring biased idler rods to bias them outwardly against the borehole wall. The angle sensors detect the angle between the tractor and the rods, and the idlers measure their own rotational speed in the borehole. A computing unit calculates the tractor velocity.

BRIEF FIGURE CAPTIONS

The invention is illustrated in the attached drawing Figures.

FIG. 3a illustrates the transverse gear train in more detail. Further, the geometry of the wheel arm's main portion and its moment arm portion with corresponding vectors is illustrated. Also the interaction between the longitudinally translating push or actuator rod with a link arm to the moment arm is illustrated.

FIG. 3b is an illustration of the same in an orthogonal view to FIG. 3a. The assembly of the gear train in the transverse gear box is illustrated. Further, it is illustrated that the arms may be inserted each into bearings at opposite surfaces of the transverse gear box. Thus the invention facilitates assembly and replacement of a drive wheel arm, and also the assembly or replacement of a transverse gear box.

DESCRIPTION OF EMBODIMENTS OF THE INVENTION

Figure 1:
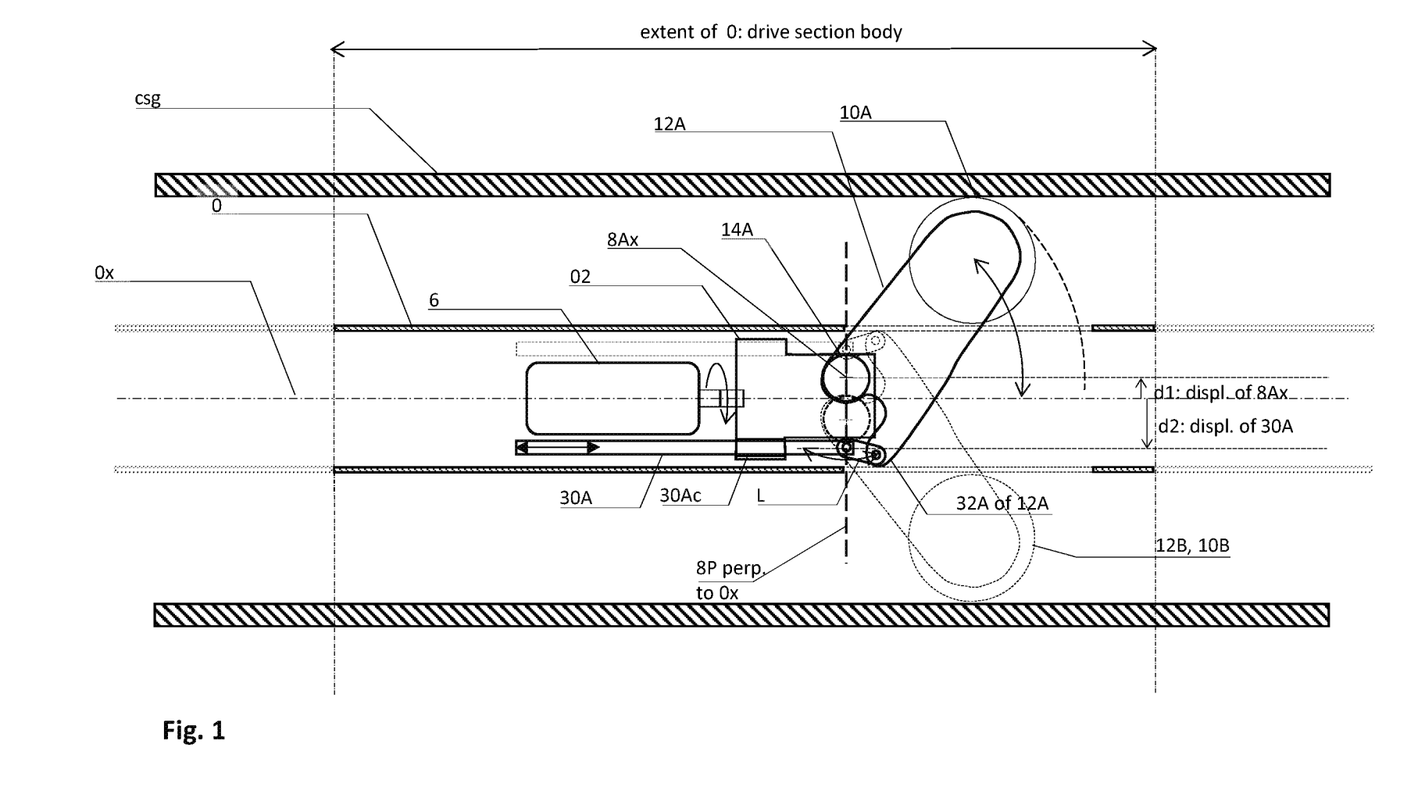
FIG. 1 illustrates a tractor drive section body comprising a pair of oppositely directed, downward-folding wheel drive arms arranged on a transverse gear box block having an axial input drive axle, and the drive arms actuated by laterally arranged actuator rods. The bearings for the wheel arms are transverse-axial and mutually oppositely displaced from the longitudinal tool axis. The drive section body is part of a well tractor and placed with its arms forced against a casing, liner, or production tubing wall.

The invention is a well tractor drive section wherein the wheel arm bearings are in mutually oppositely displaced positions with regard to the main axis, and with corresponding actuator rods which are also in mutually oppositely displaced positions, please see FIG. 1. The two arms are arranged in slots in the drive section body. The two arms fold in and out in the downhole direction as a safety precaution in order to enable the tractor to be pulled out in a passive state from the well if necessary.

More specifically, the invention is a well tractor drive section comprising the following main features, please see FIG. 1.

The drive section has a drive section body (0) with a main central axis (0x):

The drive section body (0) is provided with first and second drive wheels (10A, 10B) arranged on the ends of first and second wheel arms (12A, 12B), respectively. The drive wheels are arranged for running along an inner bore of a well. The inner bore may be a production tubing, a liner, a casing, a patch pipe, or even a borehole wall.

Each of the wheel arms (12A, 12B) is arranged pivotally about first and second transverse axes (8Ax, 8Bx) in first and second transverse-axial wheel arm bearings (14A, 14B) on a central, structural block (02), please see FIG. 1. The wheel arms are for supporting the drive wheels and moving the drive wheels from a retracted position wherein the wheels' centres are near the main central axis, to an extended position with the wheels in contact with the well bore, or vice versa please see FIG. 3a.

The first and second transverse-axes (8Ax, 8Bx) are mutually oppositely laterally displaced with a first separation (d1) from said main central axis (0x) in a common perpendicular plane (8P) relative to said main central axis (0x), please see FIG. 1. Thus the transverse axes, i.e. the centres of the bearings (14A, 14B) have a mutual separation (2×d1) perpendicular to the central axis (0x).

There are arranged first and second actuator rods (30A, 30B). In an embodiment of the invention, the first and second actuator rods (30A, 30B) are parallel with the main axis (0x).

Each actuator rod is connected to a moment arm (32A, 32B) of said first and second wheel arms (12A, 12B), for actuating the wheel arms (12A, 12B) to rotate about said bearings (14A, 14B) in a direction away from the main axis (0x) for forcing the drive wheels to engage with the inner bore of the well. The return may be via a pre-loaded spring mechanism or actuated by the same mechanism which runs the actuator rods.

In a preferred embodiment of the invention the pairs of arms, the bearings (14A, 14B), and the actuator rods (30A, 30B) are arranged in rotational symmetry about the main central axis (0x).

There are some advantages of the invention: having the pivot axis position for each arm displaced a distance (d1) away from the centerline of the drive section allows increasing the mechanical advantage of the arm. Further, having the actuator rod engaged at a wheel arm's moment arm oppositely arranged relative to the arm's pivot axis with regard to the main axis, will further increase the so-called "mechanical advantage" of the drive wheel arms. We define mechanical advantage as the radial force exerted by both arms to the casing wall divided by the axial piston force, here the axial force on the actuator rods.

A further advantage resulting from having the two arms oppositely extending from bearings placed in the same transverse plane along the main axis is a resulting short, compact drive section body (0) instead of two oppositely directed arms arranged one sequentially along the drive section body as in the prior art, please see FIG. 5. A short tractor is advantageous because it reduces the resulting length of a tool string to be inserted in a lock chamber on work deck above the wellhead. Two or more tractor sections according to the invention arranged in sequence would be preferred in order to have the most stable position when running within the well. A short design is also advantageous with regard to weight reduction as it requires a shorter structural body.

Angular Gear Housing

In an embodiment of the invention, a central, structural block (02) comprises—an angular gear housing (2) having a preferably axially directed input shaft (4) for being driven by preferably an axial-cylindrical drive motor (6) and having first and second transverse output drive shafts (8A, 8B) further connected via a transmission mechanism to the drive wheels (10A, 10B); The two output drive shafts (8A, 8B) are directed along first and second transverse axes (8Ax, 8Bx), respectively. In other words, each output drive shaft (8A, 8B) is coaxially arranged with its corresponding wheel arm bearing (14A, 14B) on the angular gear housing (2), as appears from FIG. 2.

An advantage of this embodiment with an angular gear housing with oppositely displaced transverse output drive shafts is that each output drive shaft is now co-axial with its corresponding arm bearing, which allows two opposite arms in the same longitudinal position along the drive section body, a significant improvement over the prior art illustrated in FIG. 5.

Angular Gear Box with Internal Angular Gear Train.

In an embodiment of the invention, the angular gear housing (2) comprises an angular transmission gear train (20) comprising two or more gears (21, 23, 25, 27, 29) connecting an axial-parallel input shaft (4) of said gear housing (2) to said transverse first and second output shafts (8A, 8B) directly or indirectly. Please see FIGS. 2 and 3. In a preferred embodiment those are arranged in a structural block (02). The reason for having an angular transmission gear train is the fact that an axial-cylindrical motor (6), which is more space-efficient, requires an axially directed input shaft (4), and the rotational torque from the input shaft should preferably be made transverse for each drive arm, in order to connect to an input gear in the drive arm. An advantage of having transverse output axes from the gear box is that each output axis will be parallel with its corresponding drive wheel axis, allowing a slender gear train with all gears rotating parallel with a common plane within the gear arm, thus obtaining a slender wheel arm. As an alternative to an internal transmission gear, each arm may comprise another mode of transmission such as a belt or chain drive.

Details of the Angular Gear Train

Figures 3A, 3B:
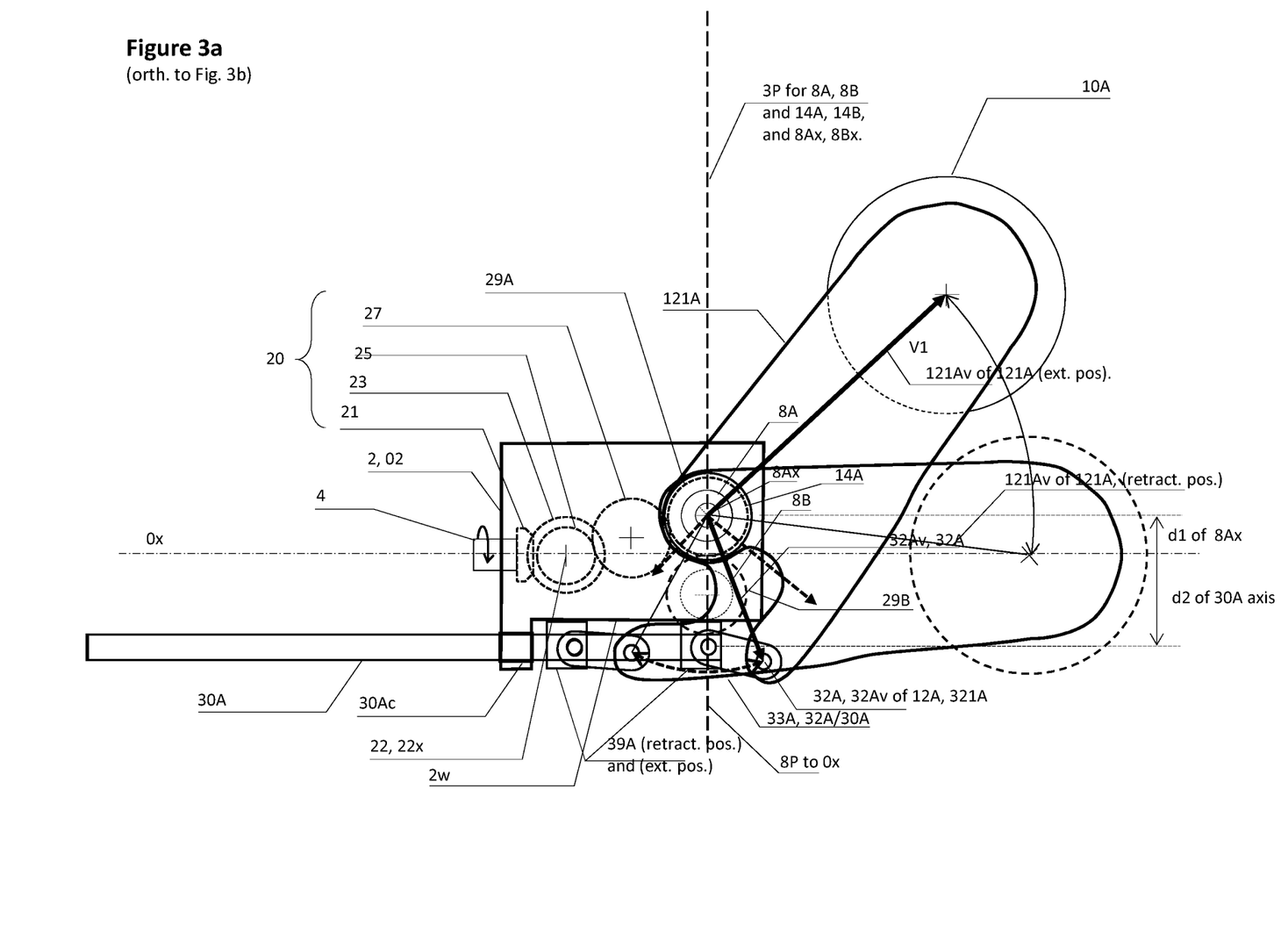

In an embodiment of the invention, the angular transmission gear train (20) comprises an angular gear pair (21, 23) of two bevel gears;

an axial bevel gear (21) on said input shaft (4) and connected to a transverse bevel gear (23) on a first transverse axle (22) and driven by said axial bevel gear (21), said transverse bevel gear (23) further connected to said first and second output shafts (8A, 8B) directly or indirectly, as further shown in FIGS. 3a and 3b.

In a further embodiment of the invention, the angular transmission gear train's (20) transverse bevel gear (23) on the first transverse axle (22) rotates with a first spur gear (25). This first spur gear (25) meshes with a second spur gear (27) further connected to the first and second output shafts (8A, 8B) directly or indirectly. Alternative to spur gears helical gears may be employed. In a preferred embodiment the second spur gear (27) drives a third, first transverse axial gear (29A) co-axial with the first transverse axis (8Ax). In an embodiment of the invention, and this first transverse axial gear (29A) further drives a second transverse axial gear (29B) co-axial with the second transverse axis (8Bx), then rotating in an opposite direction.

In an embodiment of the invention, the second spur gear (27) meshes with the third "first" transverse axial gear (29A) rotating with the first transverse output shaft (8A). Further, the third transverse axial gear (29A) is preferably thus further connected via the third "second" transverse axial gear (29B) rotating with said second transverse output shaft (8B). This makes the rotational directions of the first and second transverse axial gears (29A, 29B) opposite, which is an advantage if mutually symmetrically built-up drive arms are to be utilized, regardless of their internal design. A further advantage is that the gear trains' output shafts (8A, 8B) are arranged within, and coaxially with, the arm bearings (14A, 14B). which makes the angular gear box compact.

Gear Trains in the Arms:

In an embodiment of the invention the output shafts (8A, 8B) from the angular gear box (2) are each provided with internal splines (8AS, 8BS) arranged for engaging axially into external splines of the axle (18A, 18B) of the first gear (16A, 16B) in said first and second wheel arms (12A, 12B). The input axles (18A, 18B) are co-axial with the corresponding arm bearings (14A, 14B) and said corresponding first and second transverse axes (8Ax, 8Bx). Having an actual gear as an output of the angular gearbox which engaged directly to a gear in the arm, would be an alternative embodiment. The input axles (18A, 18B) are connected further their corresponding drive wheels (10A, 10B). The connection from the arms' input axles (18A, 18B) within the arms to the wheels (10A, 10B) occurs in an embodiment of the invention via simple gear trains internally in the arms. An alternative transmission would be a simple belt drive or chain known per se, or even a hydraulic transmission.

Linkage Details:

In an embodiment of the invention shown in FIGS. 1, 2, 3a, and 3b, the wheel arm (12A) comprises two main portions; the main arm portion (121A) carrying the wheel (10A) near its outer end, and a moment arm portion (32A) having a link bolt (321A) near its outer end for being linked to the actuator rod (30A). The main arm portion (121A) corresponds to a vector (121Av) extending from the bearing's (14A) axis (8Ax) out to the drive wheel's (10A) axis. The moment arm portion (30A) corresponds to a moment arm vector (32Av) extending from the same arm bearing's (14A) axis (8Ax) to the link bolt's (321A) axis. The angle between the vectors (121Av, 32Av) is obtuse, more than 90 degrees and preferably less than 135 degrees. The opposite wheel arm (12B) is built up accordingly.

The moment arm (32A) has a component which extends in a direction opposite of the wheel arm main portion (121A), and a component which is orthogonal to it, please see FIG. 3a. This is best seen in FIG. 3a. The moment arm (32A) extends rearward with regard to its corresponding main arm portion (121A) beyond the transverse axis and provides the advantage of having an increasing moment thus increasing mechanical advantage during an intermediate part of the swing range of the arm. The angle is significantly more than 90 degrees and less than 135 degrees. The moment arm is longer than the separation (d1+d2) of the transverse axis and the actuator rod axis.

In FIG. 3a, only components related to the first wheel arm (12A) such as main arm portion (121A), moment arm (32A), etc. are shown and numerated. Corresponding components (121B, 32B) etc. of the opposite, second wheel arm (12B) mentioned in this text are not illustrated in FIG. 3b.

In an embodiment of the invention, the first and second wheel arms (12A, 12B) are designed identically and mounted from opposite directions onto the central structural block (02), please see FIG. 3b. Thus only one type of wheel arms needs be manufactured which reduces maintenance costs and the number of replacement parts required during an operation.

In a preferred embodiment of the invention the actuator rod is arranged sliding in a bearing (30Ac, 30Bc) in the angular gear housing (2) to force the translation to occur along a fixed line for each rod. A link element (33A, 33B) is arranged between moment arm (32A, 32B) and the end of actuator rod (30A, 30B). With the geometry described above and illustrated in FIG. 3a, the moment arm vector (32A, 32B) will exert a force on the rod via the link element (33A, 33B) in the direction "inwards" towards the gear housing (02). In order to resolve this transverse force from the link element, a slide block (39A, 39B) is arranged on the end of the actuator rod (30A, 30B), and the slide block slides along a corresponding axis-parallel slide wall (2w) on the housing (2). In this way any initial bending moment on the end of the actuator rod (30A) is counteracted; the force arising from the push arm pushing on the link section has a component in the direction of the main axis (0x), and that the sliding support block sliding on the wall (2w) prevents bending of the actuator rod.

In an embodiment of the invention the first and second actuator rods (30A, 30B) are hydraulically actuated. A hydraulic actuator for downhole tools is known to the person skilled in the art and is not detailed herein.

US2005/0145415 Doering describes a wheel tractor section with a pair of idler wheels mounted on spring biased idler rods to bias them outwardly against the borehole wall. The angle sensors detect the angle between the tractor and the rods, and the idlers measure their own rotational speed in the borehole. A computing unit calculates the tractor velocity.

BRIEF FIGURE CAPTIONS

The invention is illustrated in the attached drawing Figures.

FIG. 1 illustrates a tractor drive section body comprising a pair of oppositely directed, downward-folding wheel drive arms arranged on a transverse gear box block having an axial input drive axle, and the drive arms actuated by laterally arranged actuator rods. The bearings for the wheel arms are transverse-axial and mutually oppositely displaced from the longitudinal tool axis. The drive section body is part of a well tractor and placed with its arms forced against a casing, liner, or production tubing wall.

Figure 2:
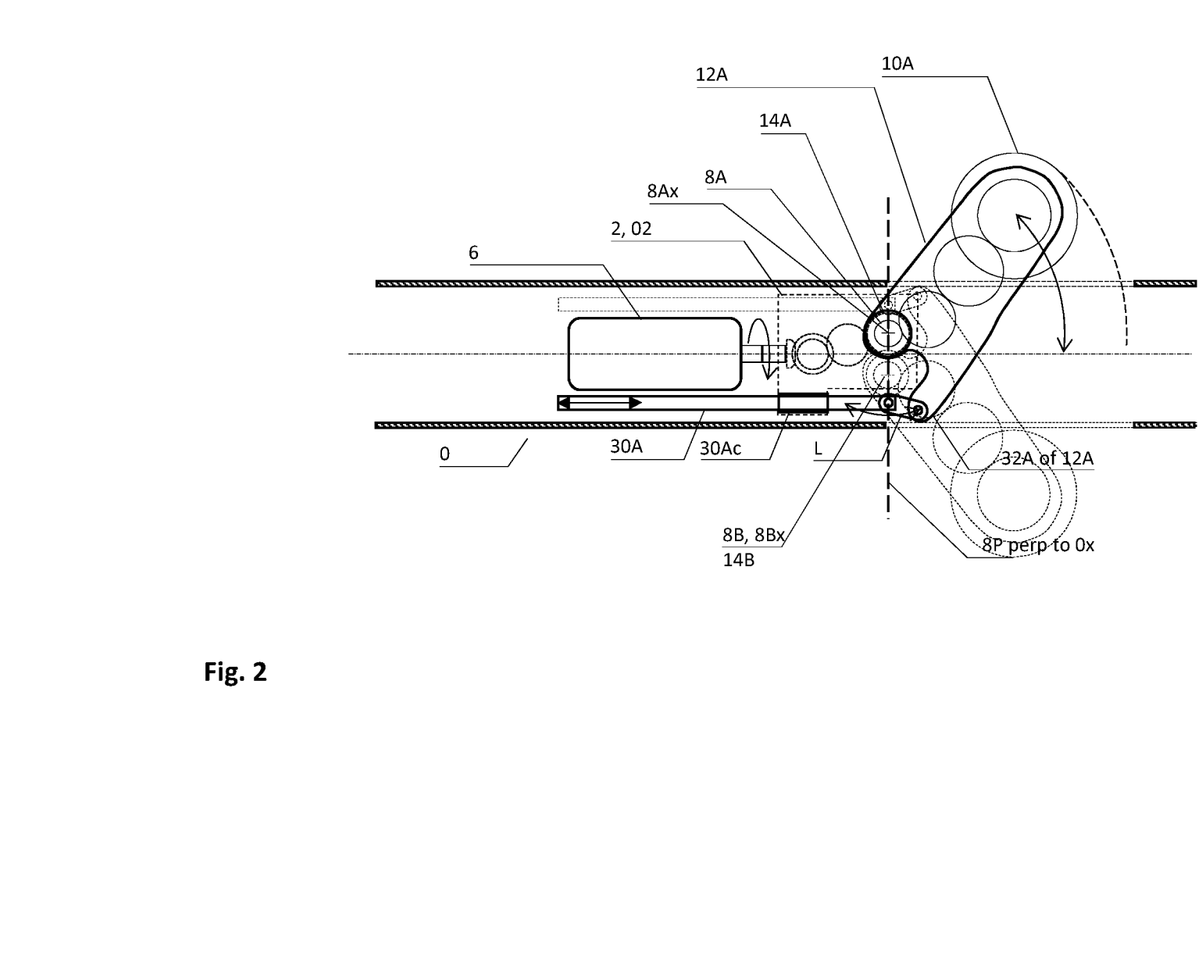
FIG. 2 illustrates the presence of a transverse gear train converting the axial rotation from the input axle to two oppositely displaced transverse drive shafts via a gear train. The presence of a gear train in each drive arm is only an example and is not the main subject of the present invention. Each drive arm folds out from a slot and the arm with the drive wheel may be folded in to near the central axis.

FIG. 2 illustrates the presence of a transverse gear train converting the axial rotation from the input axle to two oppositely displaced transverse drive shafts via a gear train. The presence of a gear train in each drive arm is only an example and is not the main subject of the present invention. Each drive arm folds out from a slot and the arm with the drive wheel may be folded in to near the central axis.

FIG. 3a illustrates the transverse gear train in more detail. Further, the geometry of the wheel arm's main portion and its moment arm portion with corresponding vectors is illustrated. Also the interaction between the longitudinally translating push or actuator rod with a link arm to the moment arm is illustrated.

FIG. 3b is an illustration of the same in an orthogonal view to FIG. 3a. The assembly of the gear train in the transverse gear box is illustrated. Further, it is illustrated that the arms may be inserted each into bearings at opposite surfaces of the transverse gear box.

Thus the invention facilitates assembly and replacement of a drive wheel arm, and also the assembly or replacement of a transverse gear box.

Figure 4:
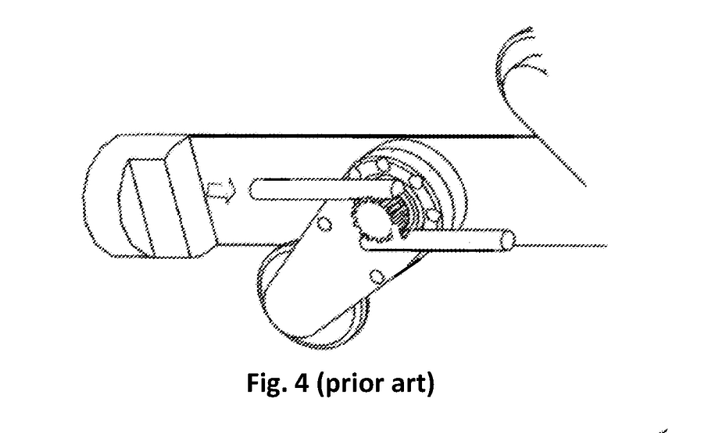
FIG. 4 is an illustration of the actuator rods and a single drive wheel arm of the applicant's own U.S. Pat No. 326,593 which is considered as prior art.

FIG. 4 is an illustration of the actuator rods and a single drive wheel arm of the applicant's own U.S. Pat. No. 326,593 which is considered as prior art.

FIG. 5 is an illustration of a non-axial longitudinally extending long drive axle for two non-parallel drive wheel arms, one of them showing only the internal gear train from the input bevel gear to the drive wheel, the other with a complete drive wheel arm housing.

DESCRIPTION OF EMBODIMENTS OF THE INVENTION

The invention is a well tractor drive section wherein the wheel arm bearings are in mutually oppositely displaced positions with regard to the main axis, and with corresponding actuator rods which are also in mutually oppositely displaced positions, please see FIG. 1. The two arms are arranged in slots in the drive section body. The two arms fold in and out in the downhole direction as a safety precaution in order to enable the tractor to be pulled out in a passive state from the well if necessary.

More specifically, the invention is a well tractor drive section comprising the following main features, please see FIG. 1.

The drive section has a drive section body (0) with a main central axis (0x):

The drive section body (0) is provided with first and second drive wheels (10A, 10B) arranged on the ends of first and second wheel arms (12A, 12B), respectively. The drive wheels are arranged for running along an inner bore of a well. The inner bore may be a production tubing, a liner, a casing, a patch pipe, or even a borehole wall.

Each of the wheel arms (12A, 12B) is arranged pivotally about first and second transverse axes (8Ax, 8Bx) in first and second transverse-axial wheel arm bearings (14A, 14B) on a central, structural block (02), please see FIG. 1. The wheel arms are for supporting the drive wheels and moving the drive wheels from a retracted position wherein the wheels' centres are near the main central axis, to an extended position with the wheels in contact with the well bore, or vice versa please see FIG. 3a.

The first and second transverse-axes (8Ax, 8Bx) are mutually oppositely laterally displaced with a first separation (d1) from said main central axis (0x) in a common perpendicular plane (8P) relative to said main central axis (0x), please see FIG. 1. Thus the transverse axes, i.e. the centres of the bearings (14A, 14B) have a mutual separation (2×d1) perpendicular to the central axis (0x).

There are arranged first and second actuator rods (30A, 30B). In an embodiment of the invention, the first and second actuator rods (30A, 30B) are parallel with the main axis (0x).

Each actuator rod is connected to a moment arm (32A, 32B) of said first and second wheel arms (12A, 12B), for actuating the wheel arms (12A, 12B) to rotate about said bearings (14A, 14B) in a direction away from the main axis (0x) for forcing the drive wheels to engage with the inner bore of the well. The return may be via a pre-loaded spring mechanism or actuated by the same mechanism which runs the actuator rods.

In a preferred embodiment of the invention the pairs of arms, the bearings (14A, 14B), and the actuator rods (30A, 30B) are arranged in rotational symmetry about the main central axis (0x).

There are some advantages of the invention: having the pivot axis position for each arm displaced a distance (d1) away from the centerline of the drive section allows increasing the mechanical advantage of the arm. Further, having the actuator rod engaged at a wheel arm's moment arm oppositely arranged relative to the arm's pivot axis with regard to the main axis, will further increase the so-called "mechanical advantage" of the drive wheel arms. We define mechanical advantage as the radial force exerted by both arms to the casing wall divided by the axial piston force, here the axial force on the actuator rods.

A further advantage resulting from having the two arms oppositely extending from bearings placed in the same transverse plane along the main axis is a resulting short, compact drive section body (0) instead of two oppositely directed arms arranged one sequentially along the drive section body as in the prior art, please see FIG. 5. A short tractor is advantageous because it reduces the resulting length of a tool string to be inserted in a lock chamber on work deck above the wellhead. Two or more tractor sections according to the invention arranged in sequence would be preferred in order to have the most stable position when running within the well. A short design is also advantageous with regard to weight reduction as it requires a shorter structural body.

Angular Gear Housing

In an embodiment of the invention, a central, structural block (02) comprises—an angular gear housing (2) having a preferably axially directed input shaft (4) for being driven by preferably an axial-cylindrical drive motor (6) and having first and second transverse output drive shafts (8A, 8B) further connected via a transmission mechanism to the drive wheels (10A, 10B); The two output drive shafts (8A, 8B) are directed along first and second transverse axes (8Ax, 8Bx), respectively. In other words, each output drive shaft (8A, 8B) is coaxially arranged with its corresponding wheel arm bearing (14A, 14B) on the angular gear housing (2), as appears from FIG. 2.

An advantage of this embodiment with an angular gear housing with oppositely displaced transverse output drive shafts is that each output drive shaft is now co-axial with its corresponding arm bearing, which allows two opposite arms in the same longitudinal position along the drive section body, a significant improvement over the prior art illustrated in FIG. 5.

Angular Gear Box with Internal Angular Gear Train.

In an embodiment of the invention, the angular gear housing (2) comprises an angular transmission gear train (20) comprising two or more gears (21, 23, 25, 27, 29) connecting an axial-parallel input shaft (4) of said gear housing (2) to said transverse first and second output shafts (8A, 8B) directly or indirectly. Please see FIGS. 2 and 3. In a preferred embodiment those are arranged in a structural block (02). The reason for having an angular transmission gear train is the fact that an axial-cylindrical motor (6), which is more space-efficient, requires an axially directed input shaft (4), and the rotational torque from the input shaft should preferably be made transverse for each drive arm, in order to connect to an input gear in the drive arm. An advantage of having transverse output axes from the gear box is that each output axis will be parallel with its corresponding drive wheel axis, allowing a slender gear train with all gears rotating parallel with a common plane within the gear arm, thus obtaining a slender wheel arm.

As an alternative to an internal transmission gear, each arm may comprise another mode of transmission such as a belt or chain drive.

Details of the Angular Gear Train

In an embodiment of the invention, the angular transmission gear train (20) comprises an angular gear pair (21, 23) of two bevel gears;

an axial bevel gear (21) on said input shaft (4) and connected to a transverse bevel gear (23) on a first transverse axle (22) and driven by said axial bevel gear (21), said transverse bevel gear (23) further connected to said first and second output shafts (8A, 8B) directly or indirectly, as further shown in FIGS. 3a and 3b.

In a further embodiment of the invention, the angular transmission gear train's (20) transverse bevel gear (23) on the first transverse axle (22) rotates with a first spur gear (25). This first spur gear (25) meshes with a second spur gear (27) further connected to the first and second output shafts (8A, 8B) directly or indirectly. Alternative to spur gears helical gears may be employed. In a preferred embodiment the second spur gear (27) drives a third, first transverse axial gear (29A) co-axial with the first transverse axis (8Ax). In an embodiment of the invention, and this first transverse axial gear (29A) further drives a second transverse axial gear (29B) co-axial with the second transverse axis (8Bx), then rotating in an opposite direction.

In an embodiment of the invention, the second spur gear (27) meshes with the third "first" transverse axial gear (29A) rotating with the first transverse output shaft (8A). Further, the third transverse axial gear (29A) is preferably thus further connected via the third "second" transverse axial gear (29B) rotating with said second transverse output shaft (8B). This makes the rotational directions of the first and second transverse axial gears (29A, 29B) opposite, which is an advantage if mutually symmetrically built-up drive arms are to be utilized, regardless of their internal design. A further advantage is that the gear trains' output shafts (8A, 8B) are arranged within, and coaxially with, the arm bearings (14A, 14B). which makes the angular gear box compact.

Gear Trains in the Arms:

In an embodiment of the invention the output shafts (8A, 8B) from the angular gear box (2) are each provided with internal splines (8AS, 8BS) arranged for engaging axially into external splines of the axle (18A, 18B) of the first gear (16A, 16B) in said first and second wheel arms (12A, 12B). The input axles (18A, 18B) are co-axial with the corresponding arm bearings (14A, 14B) and said corresponding first and second transverse axes (8Ax, 8Bx). Having an actual gear as an output of the angular gearbox which engaged directly to a gear in the arm, would be an alternative embodiment. The input axles (18A, 18B) are connected further their corresponding drive wheels (10A, 10B). The connection from the arms' input axles (18A, 18B) within the arms to the wheels (10A, 10B) occurs in an embodiment of the invention via simple gear trains internally in the arms. An alternative transmission would be a simple belt drive or chain known per se, or even a hydraulic transmission.

Linkage Details:

In an embodiment of the invention shown in FIGS. 1, 2, 3a, and 3b, the wheel arm (12A) comprises two main portions; the main arm portion (121A) carrying the wheel (10A) near its outer end, and a moment arm portion (32A) having a link bolt (321A) near its outer end for being linked to the actuator rod (30A). The main arm portion (121A) corresponds to a vector (121Av) extending from the bearing's (14A) axis (8Ax) out to the drive wheel's (10A) axis. The moment arm portion (30A) corresponds to a moment arm vector (32Av) extending from the same arm bearing's (14A) axis (8Ax) to the link bolt's (321A) axis. The angle between the vectors (121Av, 32Av) is obtuse, more than 90 degrees and preferably less than 135 degrees. The opposite wheel arm (12B) is built up accordingly.

The moment arm (32A) has a component which extends in a direction opposite of the wheel arm main portion (121A), and a component which is orthogonal to it, please see FIG. 3a. This is best seen in FIG. 3a. The moment arm (32A) extends rearward with regard to its corresponding main arm portion (121A) beyond the transverse axis and provides the advantage of having an increasing moment thus increasing mechanical advantage during an intermediate part of the swing range of the arm. The angle is significantly more than 90 degrees and less than 135 degrees. The moment arm is longer than the separation (d1+d2) of the transverse axis and the actuator rod axis.

In FIG. 3a, only components related to the first wheel arm (12A) such as main arm portion (121A), moment arm (32A), etc. are shown and numerated. Corresponding components (121B, 32B) etc. of the opposite, second wheel arm (12B) mentioned in this text are not illustrated in FIG. 3b.

In an embodiment of the invention, the first and second wheel arms (12A, 12B) are designed identically and mounted from opposite directions onto the central structural block (02), please see FIG. 3b. Thus only one type of wheel arms needs be manufactured which reduces maintenance costs and the number of replacement parts required during an operation.

In a preferred embodiment of the invention the actuator rod is arranged sliding in a bearing (30Ac, 30Bc) in the angular gear housing (2) to force the translation to occur along a fixed line for each rod. A link element (33A, 33B) is arranged between moment arm (32A, 32B) and the end of actuator rod (30A, 30B). With the geometry described above and illustrated in FIG. 3a, the moment arm vector (32A, 32B) will exert a force on the rod via the link element (33A, 33B) in the direction "inwards" towards the gear housing (02). In order to resolve this transverse force from the link element, a slide block (39A, 39B) is arranged on the end of the actuator rod (30A, 30B), and the slide block slides along a corresponding axis-parallel slide wall (2w) on the housing (2). In this way any initial bending moment on the end of the actuator rod (30A) is counteracted; the force arising from the push arm pushing on the link section has a component in the direction of the main axis (0x), and that the sliding support block sliding on the wall (2w) prevents bending of the actuator rod.

In an embodiment of the invention the first and second actuator rods (30A, 30B) are hydraulically actuated. A hydraulic actuator for downhole tools is known to the person skilled in the art and is not detailed herein.

The invention claimed is:

1. A well tractor drive section comprising
   a drive section body with main central axis, with
   first and second drive wheels on the outer ends of first and second wheel arms;
   inner ends of said wheel arms arranged pivotally about first and second transverse axes for said wheel arms to rotate in a direction away from said main axis to engage said drive wheels with an inner wall of a well;
   said pivotally arranged inner ends of said wheel arms are arranged in first and second transverse-axial wheel arm bearings about first and second transverse axes;
   said first and second transverse-axes being mutually oppositely laterally displaced with a first separation from said main central axis in a common perpendicular plane relative to said main central axis;
   characterized in that
   said first and second wheel arm bearings arranged on a central, structural block; and
   first and second actuator rods connected to a moment arm of said first and second wheel arms, for actuating said wheel arms to rotate about said bearings.

2. The well tractor drive section of claim 1,
said first and second actuator rods being parallel with said main axis.

3. The well tractor drive section of claim 2,
said first and second actuator rods arranged laterally displaced from the main axis a distance, to be engaged with said moment arm oppositely directed relative to the corresponding wheel arm's displaced pivot axis with regard to the main axis.

4. The well tractor drive section according to claim 3,
said central, structural block further comprising
an angular gear housing having an axially directed input shaft driven by a drive motor and having first and second transverse output drive shafts further connected via said wheel arms to said drive wheels;
said output drive shafts directed along said first and second transverse axes, respectively.

5. The drive section of claim 4,
said angular gear housing comprising an angular transmission gear train comprising two or more gears connecting said axial input shaft to said transverse first and second output shafts directly or indirectly.

6. The well tractor drive section of claim 5,
said angular transmission gear train comprising an angular gear pair of—an axial bevel gear on said input shaft and connected to
a transverse bevel gear on a first transverse axle and driven by said axial bevel gear, said transverse bevel gear further connected to said first and second output shafts.

7. The drive section of claim 6,
said transverse bevel gear on said first transverse axle rotating with a first spur gear, said first spur gear meshing with a second spur gear further connected to said first and second output shafts.

8. The drive section of claim 7, said second spur gear meshing with a third "first" transverse axial gear rotating with said first transverse output shaft.

9. The drive section of claim 8, said third transverse axial gear further connected via a third "second" transverse axial gear rotating with said second transverse output shaft.

10. The drive section of claim 2,
said output shafts connectable to input axles in said first and second wheel arms, respectively,
said input axles being co-axial with said bearings and said first and second transverse axes, respectively, said input axles further connected with corresponding said drive wheels.

11. The tractor drive section of claim 10,
said input axles connected to said drive wheels via arm internal gear trains with all gears rotating parallel with a common plane within the gear arm.

12. The tractor drive section of claim 1,
wherein each wheel arm comprises a main arm portion corresponding to a main vector extending from the pivot axis to the wheel's axes, and the moment arm portion corresponding to a moment arm vector, and the angle between the vectors is obtuse.

13. The tractor drive section of claim 12,
comprising a bearing through said angular gear block for said actuator rod, and a sliding support block on the end of said actuator rod connected to a link element further connected to said moment arm, said sliding support block arranged for sliding along an axial-parallel support wall of said gear block.

* * * * *